(12) United States Patent
Liu

(10) Patent No.: US 8,971,350 B1
(45) Date of Patent: Mar. 3, 2015

(54) ACCESSING CHANNELS IN A MULTI-CHANNEL COMMUNICATION SYSTEM

(75) Inventor: Yong Liu, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 386 days.

(21) Appl. No.: 13/440,214

(22) Filed: Apr. 5, 2012

Related U.S. Application Data

(60) Provisional application No. 61/477,455, filed on Apr. 20, 2011.

(51) Int. Cl.
*H04L 12/413* (2006.01)
*H04L 5/00* (2006.01)

(52) U.S. Cl.
CPC .............. *H04L 5/0094* (2013.01); *H04L 5/001* (2013.01)
USPC ........................................................ 370/445

(58) Field of Classification Search
CPC ... H04L 1/0071; H04L 5/0007; H04L 5/0023; H04L 5/0037; H04W 68/00; H04W 74/002; H04W 74/0816
See application file for complete search history.

(56) References Cited

U.S. PATENT DOCUMENTS

| | | | |
|---|---|---|---|
| 8,363,578 B1 | 1/2013 | Ramamurthy et al. | |
| 8,670,399 B2 | 3/2014 | Liu et al. | |
| 8,737,405 B2 | 5/2014 | Liu et al. | |
| 8,787,338 B2 | 7/2014 | Liu et al. | |
| 8,787,385 B2 | 7/2014 | Liu et al. | |
| 8,811,203 B1 | 8/2014 | Liu et al. | |
| 2001/0019542 A1* | 9/2001 | Diachina et al. | 370/329 |
| 2007/0019592 A1* | 1/2007 | Otsuki | 370/338 |
| 2008/0070510 A1* | 3/2008 | Doppler et al. | 455/69 |
| 2008/0192644 A1 | 8/2008 | Utsunomiya et al. | |
| 2011/0222486 A1* | 9/2011 | Hart | 370/329 |
| 2012/0320856 A1* | 12/2012 | Kim et al. | 370/329 |

OTHER PUBLICATIONS de Vegt, "Potential Compromise for 802.11ah Use Case Document", Institute of Electrical and Electronics Engineers, doc. no. IEEE 802,11-11/0457r0, (Mar. 2011)

(Continued)

*Primary Examiner* — Yong Zhou

(57) ABSTRACT

In a method of determining channel availability in a wireless communication network utilizing at least first and second sub-channels, a first signal is received via a first channel. The first signal includes first access control information indicating expected utilization of the first channel. The first channel includes the first sub-channel. A first sub-channel availability indicator is updated based on the first access control information. The first sub-channel availability indicator indicates expected utilization of the first sub-channel. A second signal is received via a second channel. The second signal includes second access control information indicating expected utilization of the second channel. The second channel includes the second sub-channel. A second sub-channel availability indicator is updated based on the second access control information. The second sub-channel availability indicator indicates expected utilization of the second sub-channel. A transmission channel is determined based on the first and second sub-channel availability indicators.

21 Claims, 8 Drawing Sheets

(56) References Cited

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuts and Systems, 2007 (ISCAS 2007), pp. 1645-1648 (2007).

U.S. Appl. No. 13/034,421, filed Feb. 24, 2011.

Cariou et al., "Multi-channel Transmissions," Doc. No. IEEE 802.11-09/1022r0, *The Institute of Electrical and Electronics Engineers, Inc.*, pp. 1-13 (Sep. 2009).

Yuan et al., "Carrier Aggregation for LTE-Advanced Mobile Communication Systems," *IEEE Communications Magazine*, pp. 88-93 (Feb. 2010).

Pedersen et al., "Carrier Aggregation for LTE-Advanced: Functionality and Performance Aspects," IEEE Communications Magazine, vol. 49, No. 6, pp. 89-95, Jun. 1, 2011.

Noh, et al., "Channel Selection and Management for 11ac," Doc. No. IEEE 802.11-10/0593r1, *The Institute of Electrical and Electronics Engineers, Inc.*, pp. 1-21 (May 20, 2010).

Redieteab, et al., "Cross-Layer Multichannel Aggregation for Future WLAN Systems," 2010 IEEE Int'l Conf. on Communication Systems (ICCS), pp. 740-756 (Nov. 2010).

Park, "IEEE 802.11ac: Dynamic Bandwidth Channel Access," 2011 IEEE Int'l Conf. on Communications (ICC), pp. 1-5 (Jun. 2011).

Liu, et al., "VHT BSS Channel Selection," *Institute of Electrical and Electronics Engineers, Inc.*, doc. no. IEEE 802.11-11/1433r0 (Nov. 2011).

Wannstrom, "Carrier Aggregation explained," pp. 1-6 May 2012.

\* cited by examiner

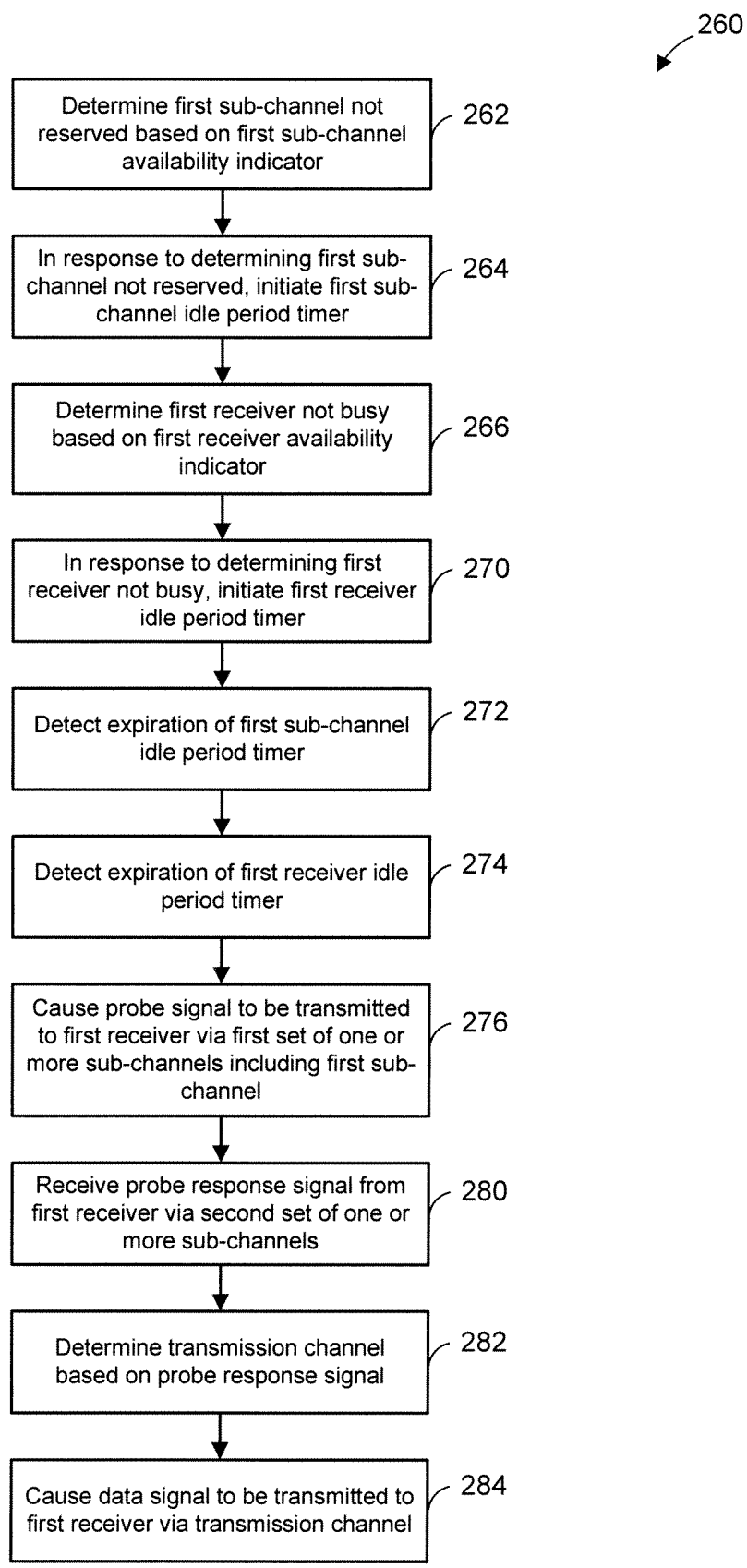

ACCESSING CHANNELS IN A MULTI-CHANNEL COMMUNICATION SYSTEM

CROSS-REFERENCES TO RELATED APPLICATION

This disclosure claims the benefit of U.S. Provisional Patent Application No. 61/477,455, entitled "802.11ah Multi-Channel Access," filed on Apr. 20, 2011, the disclosure of which is hereby incorporated by reference herein in its entirety.

FIELD OF TECHNOLOGY

The present disclosure relates generally to communication systems and, more particularly, to media access systems and methods for use in wireless networks that can operate on different communication channels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. A standard currently under development, IEEE 802.11ac, promises to provide even greater throughput. More recently, work has also begun on another new standard, IEEE 802.11 ah, that promises to provide greater range by operating in a lower, sub-1 gigahertz (GHz) frequency band.

SUMMARY

In one embodiment, a method of determining channel availability in a wireless communication network that utilizes a plurality of sub-channels, wherein multiple sub-channels in the plurality of sub-channels can be joined to form a composite channel, and wherein the plurality of sub-channels includes at least a first sub-channel and a second sub-channel, includes receiving a first signal via a first channel. The first signal includes first access control information indicating an expected utilization of the first channel. The first channel includes the first sub-channel. The method also includes updating a first sub-channel availability indicator based on the first access control information. The first sub-channel availability indicator indicates an expected utilization of the first sub-channel. The method further includes receiving a second signal via a second channel. The second signal includes second access control information indicating an expected utilization of the second channel. The second channel includes the second sub-channel. The method still further includes updating a second sub-channel availability indicator based on the second access control information. The second sub-channel availability indicator indicates an expected utilization of the second sub-channel. The method still further includes determining a transmission channel based on the first sub-channel availability indicator and the second sub-channel availability indicator.

In another embodiment, a communication device for use in a wireless communication network that utilizes a plurality of sub-channels, wherein multiple sub-channels in the plurality of sub-channels can be joined to form a composite channel, includes a network interface configured to receive a first signal via a first channel. The first signal includes first access control information indicating an expected utilization of the first channel. The first channel includes a first sub-channel. The network interface is also configured to update a first sub-channel availability indicator based on the first access control information. The first sub-channel availability indicator indicates an expected utilization of the first sub-channel. The network interface is further configured to receive a second signal via a second channel. The second signal includes second access control information indicating an expected utilization of the second channel. The second channel includes a second sub-channel. The network interface is still further configured to update a second sub-channel availability indicator based on the second access control information. The second sub-channel availability indicator indicates an expected utilization of the second sub-channel. The network interface is still further configured to determine a transmission channel based on the first sub-channel availability indicator and the second sub-channel availability indicator.

In another embodiment, a method of determining availability of channels and receivers in a wireless communication network that utilizes a plurality of sub-channels, wherein multiple sub-channels in the plurality of sub-channels can be joined to form a composite channel, includes receiving a first signal sent to or from a first receiver via a first channel. The first signal includes first access control information indicating an expected utilization of the first channel by the first receiver. The first channel includes a first sub-channel of the plurality of sub-channels. The method also includes updating a first sub-channel availability indicator based on the first access control information. The first sub-channel availability indicator indicates an expected utilization of the first sub-channel. The method further includes updating a first receiver availability indicator based on the first access control information. The first receiver availability indicator indicates expected communication activity of the first receiver.

In another embodiment, a communication device for use in a wireless communication network that utilizes a plurality of sub-channels, wherein multiple sub-channels in the plurality of sub-channels can be joined to form a composite channel, includes a network interface configured to receive a first signal sent to or from a first receiver via a first channel. The first signal includes first access control information indicating an expected utilization of the first channel by the first receiver. The first channel includes a first sub-channel. The network interface is also configured to update a first sub-channel availability indicator based on the first access control information. The first sub-channel availability indicator indicates an expected utilization of the first sub-channel. The network interface is further configured to update a first receiver availability indicator based on the first access control information. The first receiver availability indicator indicates expected communication activity of the first receiver.

BRIEF DESCRIPTION OF THE DRAWINGS

FIG. 7 is a flow diagram of an example method for determining a transmission channel that is used in conjunction with the example method of FIG. 6, according to an embodiment.

DETAILED DESCRIPTION

Various wireless communication systems utilize multiple sub-channels that can be used to transmit data individually, and/or can be aggregated to form wider-bandwidth, composite channels. In some of these systems, such as systems operating according to the current IEEE 802.11ac Standard (still in development), a communication device wishing to transmit data generally can only access the various sub-channels subject to various media access rules or conditions, which serve to protect communications between other devices in the communication system from interference.

The current version of the 802.11ac Standard reduces interference with communications of other devices in part by requiring that any data transmissions within a basic service set (BSS) be sent via a channel that includes a particular sub-channel that is assigned to the BSS and referred to as the "primary channel". Restricting data communications in a BSS to channels that include the primary channel can substantially limit the overall throughput within the BSS. Conversely, however, allowing data communications on any of multiple sub-channels in a BSS (or other communication system) raises several concerns. For example, a transmitting device may be unaware of whether an intended receiver is ready for a data transmission (e.g., whether the intended receiver is communicating with another device) when the transmitting device wakes from a long sleep mode, is busy transmitting or decoding data, and/or simply fails to properly receive signals indicating whether the intended receiver and/ or any of the various sub-channels are available. When a device becomes blind to communication activity in the system for these or other reasons, the device may transmit data that causes interference to hidden terminals, for example.

In embodiments described below, a communication device (e.g., a client station or an access point (AP)) stores and maintains multiple indicators (e.g., network allocation vectors (NAVs)) that indicate the expected utilization of various sub-channels, and/or the expected communication activity of one or more intended receivers. In one embodiment, the communication device maintains multiple NAVs, each of which is specific to a particular sub-channel. Moreover, in an embodiment, the communication device additionally maintains one or more NAVs that are each specific to an intended receiver.

Further, in some embodiments, various additional techniques described herein (e.g., transmitting probe signals to an intended receiver on idle sub-channels) help to further reduce interference with the communications of other devices in the communication system. In some embodiments, and unlike the current IEEE 802.11ac Standard, the techniques described herein may be used to allow a communication device to utilize any of multiple sub-channels for data transmissions, without restricting communications to channels that include a particular sub-channel (e.g., a primary channel of a BSS).

Figure 1:
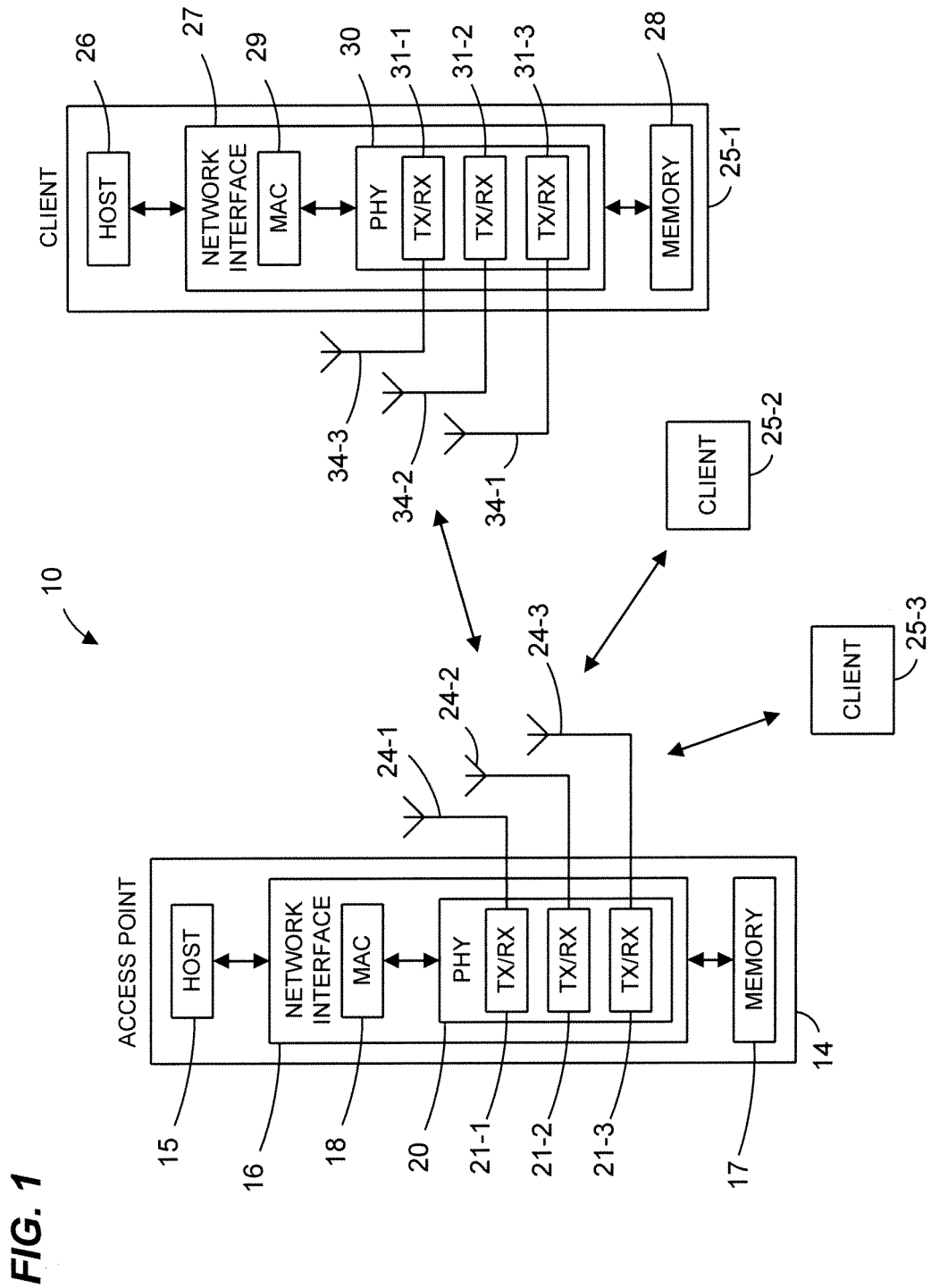
FIG. 1 is a block diagram of an example communication system that utilizes channel access techniques of the present disclosure, according to an embodiment.

FIG. 1 is a block diagram of an example communication system 10, according to an embodiment. The communication system 10 is a wireless local area network (WLAN), in an embodiment. In other embodiments, the communication system 10 is a wide area network (WAN), personal area network (PAN), or other type of system. An AP 14 in the system 10 includes a host processor 15 coupled to a network interface 16. The network interface 16 is coupled to a memory 17, and includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol that supports aggregating two or more sub-channels into a composite communication channel (e.g., the IEEE 802.11ah Standard, currently under development). In some embodiments, the MAC unit 18 and the PHY processing unit 20 are also configured to operate according to one or more second communication protocols, such as a "legacy" protocol that does not support aggregating sub-channels into a composite communication channel (e.g., the IEEE 802.11a Standard).

The communication system 10 also includes a plurality of client stations 25. Although three client stations 25 are illustrated in FIG. 1, the communication system 10 can include different numbers (e.g., 1, 2, 4, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 is coupled to a memory 28, and includes a MAC processing unit 29 and a PHY processing unit 30. The PHY processing unit 30 includes a plurality of transceivers 31, and the transceivers 31 are coupled to a plurality of antennas 34. Although three transceivers 31 and three antennas 34 are illustrated in FIG. 1, the client station 25-1 can include different numbers (e.g., 1, 2, 4, 5, etc.) of transceivers 31 and antennas 34 in other embodiments. In an embodiment, one or both of the client stations 25-2 and 25-3 is the same as or similar to the client station 25-1. In some embodiments, the network interface 27 (e.g., the MAC processing unit 29 and the PHY processing unit 30) is configured to operate according to the first communication protocol. In some embodiments, the network interface 27 (e.g., the MAC processing unit 29 and the PHY processing unit 30) is also configured to operate according to one or more second communication protocols.

In various embodiments, the PHY processing unit 20 of the AP 14 is configured to generate at least data units conforming to the first communication protocol. The transceiver(s) 21 is/are configured to transmit the generated data units via the antenna(s) 24. Similarly, the transceiver(s) 21 is/are configured to receive data units conforming to the first communication protocol via the antenna(s) 24.

In an embodiment, the memory 17 of AP 14 stores and maintains a plurality of network allocation vectors (NAVs), which generally function as a virtual carrier sensing mechanism and are described in more detail below. In an embodiment, the network interface 16 is configured to access (e.g., update and retrieve the values of) the NAVs stored in the memory 17.

In various embodiments, the PHY processing unit 30 of the client station 25-1 is configured to generate at least data units conforming to the first communication protocol. The transceiver(s) 31 is/are configured to transmit the generated data units via the antenna(s) 34. Similarly, the transceiver(s) 31 is/are configured to receive data units conforming to the first communication protocol via the antenna(s) 34.

In an embodiment, the memory 28 of client station 25-1 stores and maintains a plurality of NAVs, which generally function as a virtual carrier sensing mechanism and are described in more detail below. In an embodiment, the network interface 27 is configured to access (e.g., update and retrieve the values of) the NAVs stored in the memory 28.

In an embodiment, the AP 14 (and/or client station 25-1) is configured to detect signal energy (e.g., according to a suitable measurement technique), detect preambles (e.g., detect short and/or long training fields) of data units, and decode data in all sub-channels utilized within the communication system 10. Moreover, in some embodiments, the AP 14 (and/or client station 25-1) is configured to simultaneously detect energy and detect preambles on more than one sub-channel (e.g., on all or a subset of all sub-channels) utilized within the communication system 10. In an embodiment, when the AP 14 (and/or client station 25-1) is decoding data on one or more sub-channels, the AP 14 (and/or client station 25-1) cannot detect energy and/or detect preambles on any other sub-channels. Moreover, in an embodiment, when the AP 14 (and/or client station 25-1) is transmitting on one or more sub-channels, the AP 14 (and/or client station 25-1) cannot detect energy, detect preambles, or decode data on any sub-channels.

Figure 2:
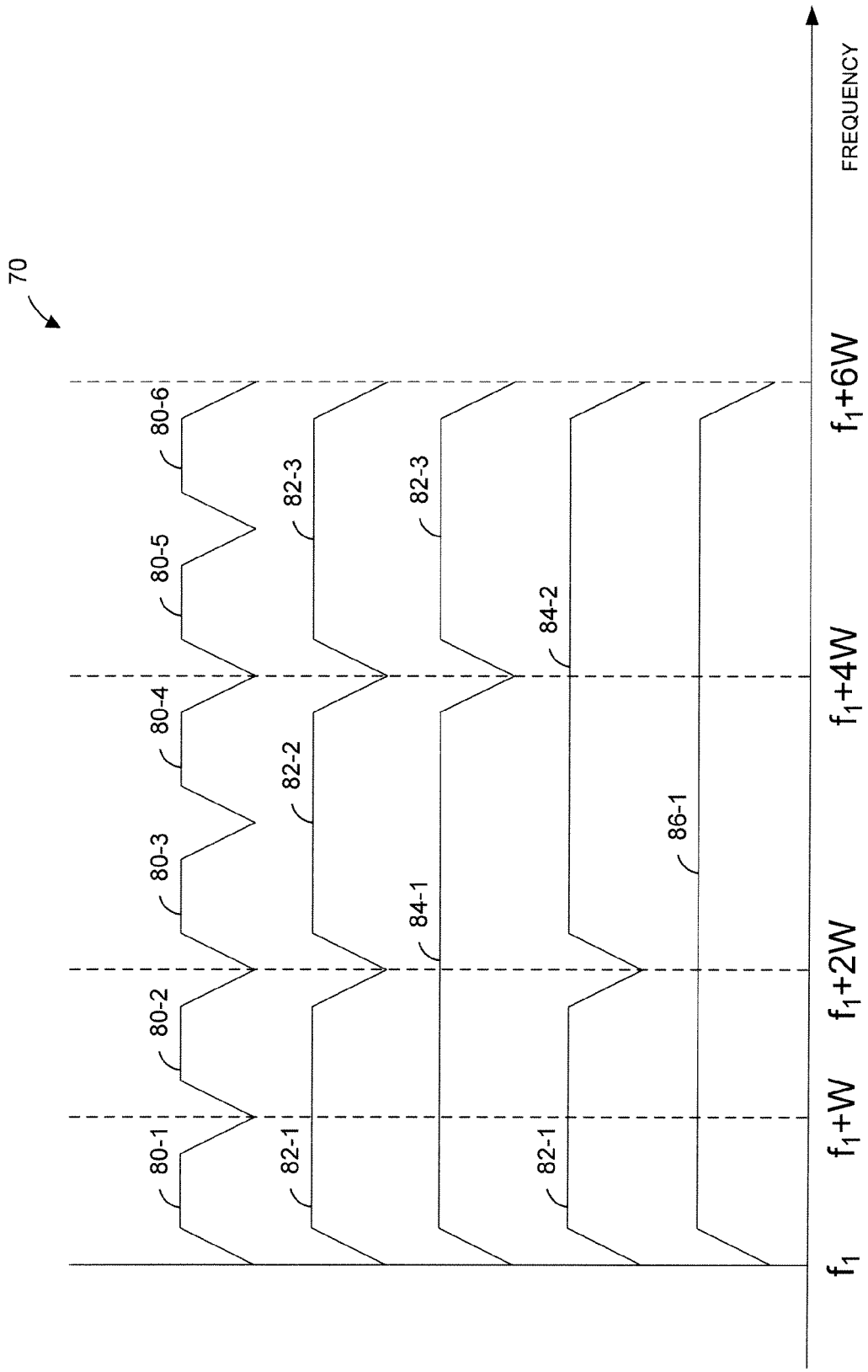
FIG. 2 is a diagram illustrating an example channel set utilized for data stream transmissions in a communication system such as the example communication system of FIG. 1, according to an embodiment.

FIG. 2 is a diagram illustrating an example channel set 70 utilized for data stream transmissions in a communication system such as the example communication system 10 of FIG. 1, according to an embodiment. The channel set 70 includes a set of six sub-channels 80-1 through 80-6. In one embodiment, each of the sub-channels 80 has a bandwidth ("W" in FIG. 2) equal to the minimum possible channel bandwidth for data transmission as specified by the first communication protocol. The sub-channels 80 have any one of various suitable bandwidths (e.g., 1 MHz, 5 MHz, 20 MHz, etc.), according to various embodiments. Although six sub-channels 80 are shown in FIG. 2, other embodiments include more or fewer than six sub-channels. Moreover, while the sub-channels 80 are shown as having the same bandwidth in FIG. 2, one or more of the sub-channels 80 has a different bandwidth, in an embodiment. For example, sub-channels 80-1 through 80-4 have a first bandwidth, sub-channel 80-5 has a second bandwidth equal to twice the first bandwidth, and sub-channel 80-6 is omitted from the channel set 70, in an embodiment.

The example channel set 70 illustrates a set of permissible channels according to one example embodiment. In particular, in this embodiment, the sub-channels 80 can be utilized individually or combined to form wider bandwidth, composite channels 82 (having twice the bandwidth of sub-channels 80), composite channels 84 (having four times the bandwidth of sub-channels 80), or a composite channel 86 (having six times the bandwidth of sub-channels 80). In particular, sub-channels 80-1 and 80-2 are combinable to form the composite channel 82-1, sub-channels 80-3 and 80-4 are combinable to form the composite channel 82-2, sub-channels 80-5 and 80-6 are combinable to form the composite channel 82-3, sub-channels 80-1 through 80-4 are combinable to form the composite channel 84-1, sub-channels 80-3 through 80-6 are combinable to form the composite channel 84-2, and sub-channels 80-1 through 80-6 are combinable to form the composite channel 86-1. In the example channel set 70, certain composite channels are not permitted by the first communication protocol and therefore not shown in FIG. 2. For example, composite channels combining only three, or only five, of the sub-channels 80 are not permitted by the first communication protocol. As another example, composite channels that include any sub-channels 80 that are not adjacent to any other sub-channels 80 in the composite channel are not permitted by the first communication protocol. As yet another example, composite channels having a first bandwidth are not permitted by the first communication protocol if the composite channel only partially overlaps any channels from the channel set 70 that have a bandwidth the same as or greater than the first bandwidth. For example, a composite channel combining sub-channels 80-2 and 80-3 is not permitted by the first communication protocol because the resulting composite channel would only partially overlap at least one channel with a greater or equal bandwidth (i.e., channels 82-1, 82-2, and 84-2 of channel set 70). In various other embodiments, more, fewer, and/or different combination rules of the first communication protocol limit the permissible composite channels and determine which channels are included within channel set 70.

Generally, a communication device determines which of sub-channels 80 are available in order to determine a transmission channel for a data signal. For example, if only sub-channels 80-1 and 80-2 are determined to be available, and if the permissible channel set 70 includes the channel 82-1 the communication device transmits the data signal via channel 82-1, in an embodiment. In some embodiments, the communication device also determines that the intended receiver is available before transmitting the data signal, as discussed further below.

The determination of whether each sub-channel is available (and, in some embodiments, whether the intended receiver is available) is made by a network interface of the communication device intending to transmit data, in an embodiment. For example, in one embodiment and scenario where the AP 14 of FIG. 1 intends to transmit a data signal, the network interface 16 (e.g., MAC processing unit 18 and/or PHY processing unit 20) determines which sub-channels are available and/or whether the intended receiver is available. Similarly, in one embodiment and scenario where the client station 25-1 of FIG. 1 intends to transmit a data signal, the network interface 27 (e.g., MAC processing unit 29 and/or PHY processing unit 30) determines which sub-channels are available and/or whether the intended receiver is available. Determining which sub-channels are available and determining whether an intended receiver is available are discussed in further detail below according to various embodiments.

Figure 3A:
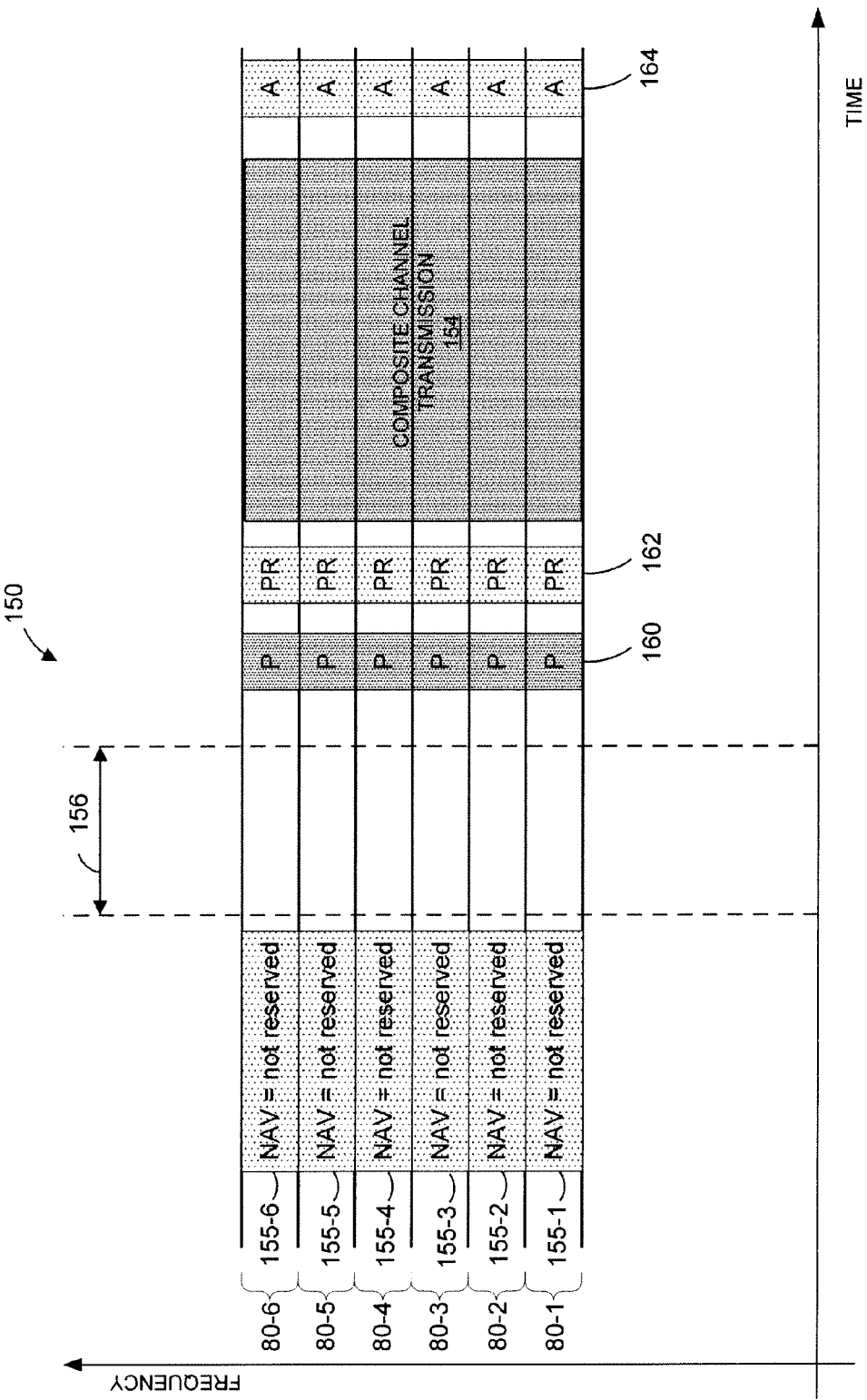
FIG. 3A is a diagram of an example transmission sequence in a communication system utilizing a channel access technique, according to an embodiment.
Figure 3B:
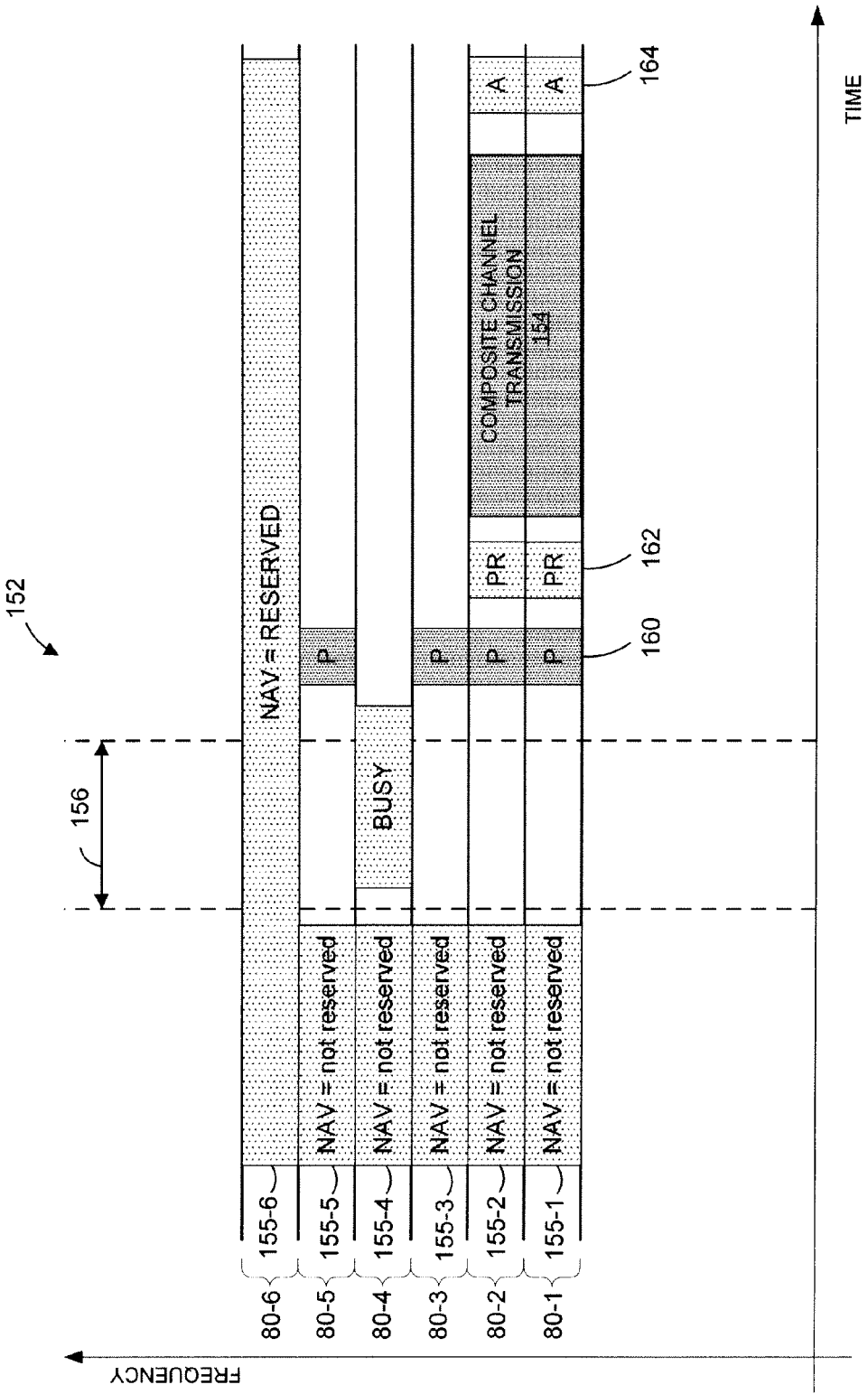
FIG. 3B is a diagram of another example transmission sequence in a communication system utilizing a channel access technique, according to an embodiment.

FIGS. 3A and 3B are diagrams of example transmission sequences 150, 152, respectively, in a communication system utilizing a channel access technique (e.g., the communication system 10 of FIG. 1), according to an embodiment. The sub-channels 80 shown in FIGS. 3A and 3B correspond to the sub-channels 80 of FIG. 2, and are a part of the channel set 70 shown in FIG. 2, in an embodiment. As discussed above with reference to FIG. 2, various other embodiments include more or fewer than six sub-channels 80. The composite channel transmission 154 in FIGS. 3A and 3B is generated and transmitted by a communication device such as the AP 14 or client station 25-1 of FIG. 1, for example. Merely for illustrative purposes, FIGS. 3A and 3B will be described with reference to the example embodiment of FIG. 1, with the composite channel transmission 154 being transmitted by the client station 25-1 to the AP 14. In other embodiments and/or scenarios, however, the AP 14 (or another communication device) transmits the composite channel transmission 154 to the client station 25-1, or the AP 14 or client station 25-1 transmits the transmission 154 to the client station 25-2 or 25-3, etc.

In one embodiment, the client station 25-1 initially determines which of sub-channels 80 is subject to NAV protection (e.g., is reserved by one or more other devices). To this end, each of sub-channels 80 is associated with a respective one of NAVs 155, in an embodiment. In an embodiment, NAVs 155 are stored in a memory such as memory 28, and are updated and accessed as needed by the network interface 27, for example. Similarly, in an embodiment, the AP 14 stores its own set of NAVs in a memory such as memory 17, for example, and the NAVs are updated and accessed as needed by the network interface 16. Client stations 25-2 and/or 25-3 store and maintain NAVs similar to NAVs 155, in an embodiment.

Each of NAVs 155 includes an indicator of an expected utilization of the respective sub-channel 80, in an embodiment. For example, in one embodiment, each of NAVs 155 includes a counter value, with a counter value of zero indicating that the respective sub-channel 80 is not reserved and a counter value above zero indicating that the respective sub-channel 80 is reserved. A NAV 155 (e.g., NAV 155-1) is updated based on access control information included in signals that client station 25-1 receives from other devices. In one embodiment, a particular NAV 155 is only updated based on access control information included in received signals that were transmitted via channels that include the sub-channel 80 corresponding to the NAV 155. For example, in one embodiment and scenario, NAV 155-1 is updated when client station 25-1 receives a signal with access control information that was sent via a channel that includes the sub-channel 80-1. In another example embodiment and scenario, NAV 155-3 and NAV 155-4 are both updated when client station 25-1 receives a signal with access control information that was sent via a channel that includes both sub-channel 80-3 and sub-channel 80-4. According to various embodiments and/or scenarios, the received signals used to update one or more of NAVs 155 include data frames and/or control frames that were transmitted from a first other communication device (e.g., from client station 25-2) to a second other communication device (e.g., to client station 25-3). Thus, the data frames, control frames, and/or other signals used to update NAVs 155 are signals that need not be specifically directed to client station 25-1, in some embodiments and/or scenarios. In some embodiments, client stations (such as client station 25-1) that are transmitting or receiving/decoding data frames on a first channel are blind to activities on all other channels. These "busy" client stations are therefore unable to set NAVs (such as NAVs 155) in response to data/control frames on other channels that request a NAV update. As a result, client stations that begin transmissions on other channels immediately after completing transmissions or receiving/decoding on the first channel may cause interference/collisions with communications between other devices.

In some embodiments, client station 25-1 attempts to update NAVs 155 by scanning one or more of sub-channels 80 for a suitable time period (e.g., a typical or maximum frame transmission duration, until detecting a transmission, etc.) before attempting to access any sub-channels 80. In one embodiment, client station 25-1 scans sub-channels 80 when client station 25-1 is aware of conditions making it likely that client station 25-1 missed a NAV update (e.g., waking from a sleep mode, having recently transmitted and/or received data on any of sub-channels 80, failing to detect NAV setting information in a preamble or frame header, etc.).

In an embodiment, the access control information used to update one or more of NAVs 155 is included in a preamble or header that is included in a received signal. In one embodiment, the access control information includes a time duration of a transmission or series of transmissions expected to occur (e.g., expected to occur on the sub-channels 80 that were utilized to send the signal including the access control information). For example, in one embodiment in which NAVs 155 are counter values, NAV 155-5 and NAV 155-6 are updated to have suitable, non-zero counter values when a signal received via sub-channels 80-5 and 80-6 includes a non-zero time duration in a preamble or header field. In one embodiment, the counter values are set equal to the time duration included in the received signal.

In some embodiments, client station 25-1 also stores and maintains one or more receiver-specific NAVs (not referenced in FIGS. 3A and 3B) corresponding to one or more receivers. In an embodiment, each receiver-specific NAV of client station 25-1 is updated when client station 25-1 receives a signal that was sent to or from the corresponding receiver. For example, in one embodiment and scenario, client station 25-1 updates a NAV specific to AP 14 when client station 25-1 receives a signal sent from client station 25-2 to AP 14 (or vice versa) that includes an expected time duration of the communication or other access control information. In one embodiment of the system 10 shown in FIG. 1, client station 25-1 stores a first additional NAV (i.e., in addition to NAVs 155) that is specific to AP 14, a second additional NAV that is specific to client station 25-2, and a third additional NAV that is specific to client station 25-3. Similarly, in one embodiment of the system 10 shown in FIG. 1, AP 14 stores a first additional NAV that is specific to client station 25-1, a second additional NAV that is specific to client station 25-2, and a third additional NAV that is specific to client station 25-3.

The number of receiver-specific NAVs stored and maintained by various devices in a system such as communication system 10 may in some embodiments depend on whether the system 10 is a peer-to-peer (P2P) system. For example, in one embodiment where the communication system 10 of FIG. 1 is not a P2P system (i.e., an infrastructure system where all communications are AP-to-client station, or vice versa), AP 14 does not store or maintain any receiver-specific NAVs, and each of client stations 25 stores and maintains a NAV specific to AP 14, but does not store or maintain NAVs specific to any of the other client stations 25.

In an embodiment, an intended receiver is considered to be busy on all sub-channels 80 if the NAV corresponding to the intended receiver indicates the intended receiver is busy. For example, in one scenario and embodiment where client station 25-1 desires to transmit a data signal to AP 14, client station 25-1 will prevent the data signal from being sent via any of the sub-channels 80 if a NAV specific to AP 14 (stored in client station 25-1) indicates that AP 14 is busy. Thus, in some embodiments, some or all of the transmission sequence 150 of FIG. 3A (and/or the transmission sequence 152 of FIG.

3B) does not occur unless a NAV specific to the intended receiver indicates that the intended receiver is not busy.

In an embodiment, any sub-channel 80 that corresponds to a NAV 155 indicating the sub-channel 80 is reserved is excluded from the composite channel transmission 154, while any sub-channel 80 that corresponds to a NAV 155 indicating that the sub-channel 80 is not reserved may or may not be excluded depending on one or more additional operations. In the embodiment shown in the example scenarios of FIGS. 3A and 3B, for example, client station 25-1 further determines whether each of the non-reserved sub-channels 80 is idle from the standpoint of client station 25-1, and/or clear from the standpoint of the intended receiver (AP 14).

In an embodiment, client station 25-1 first determines whether each of the sub-channels 80 is idle from the standpoint of client station 25-1 by using one or more clear channel assessment (CCA) techniques. For example, client station 25-1 measures an energy level on each sub-channel 80 using a suitable measurement technique, in an embodiment. In some embodiments, a measured energy level in the sub-channel 80 is compared to a threshold. Moreover, in some embodiments, the threshold is dependent on whether client station 25-1 determines that a signal received via the sub-channel 80 is a "valid" signal (e.g., a signal conforming to a particular protocol, or to one of a particular set of protocols). Example techniques for determining whether channels such as sub-channels 80 are idle from a standpoint of a first communication device such as client station 25-1 are described in more detail in U.S. patent application Ser. No. 13/034,409 (filed Feb. 24, 2011), which is hereby incorporated by reference herein in its entirety. Referring to the example embodiment of FIGS. 3A and 3B, client station 25-1 determines whether each non-reserved sub-channel 80 is idle from the standpoint of client station 25-1 at least for a time period 156. In some embodiments and/or scenarios, the time period 156 is a suitable defined and/or determined time period such as an arbitration interframe space (AIFS), a point coordination function (PCF) interframe space (PIFS), or a distributed coordination function (DCF) interframe space (DIFS), as described in the IEEE 802.11 Standard. In some embodiments and/or scenarios, the time period 156 is a time period such as the AIFS, PIFS, or DIFS described in the IEEE 802.11 Standard, plus a suitable back-off time period. In an embodiment, the back-off time period is a randomly-generated time period such as described in the IEEE 802.11 Standard. As used herein, the term "randomly generated time period" encompasses pseudo-randomly generated time periods.

In an embodiment, client station 25-1 next determines whether each of the sub-channels 80 determined to be idle from the standpoint of client station 25-1 is also clear from the standpoint of the intended receiver, AP 14. In the example embodiment illustrated in FIGS. 3A and 3B, it is determined whether a sub-channel 80 is clear from the standpoint of the AP 14 by transmitting to the AP 14 a probe frame 160 on each of the sub-channels 80. The AP 14 receives the probe frame(s) 160 from client station 25-1 and transmits a probe response frame 162 back to client station 25-1 on one, some, or all of the sub-channels 80 used for the probe frame(s) 160. In an embodiment, AP 14 only sends a probe response frame 162 on sub-channels 80 that AP 14 determines to have been idle for a sufficient period of time (e.g., for a PIFS, using a CCA technique) prior to receiving the probe response 160 on sub-channels 80, and/or that AP 14 determines to be free of NAV protection (e.g., using NAVs stored in AP 14 for the relevant sub-channels 80). Moreover, in an embodiment, AP 14 only sends a probe response frame 162 on sub-channels 80 that form a valid, largest-bandwidth channel combination according to any applicable rules (e.g., as described above with reference to channel set 70 of FIG. 2). For example, with reference to FIG. 1 and the example channel set 70 of FIG. 2, if the AP 14 receives a probe signal 160 on each of sub-channels 80-1, 80-2, and 80-3, and determines each of sub-channels 80-1, 80-2, and 80-3 to be idle and/or free of NAV protection, AP 14 may nonetheless only send a probe response frame 162 on sub-channels 80-1 and 80-2 (i.e., because a composite channel formed from sub-channels 80-1, 80-2, and 80-3 is not permitted, and because sub-channel 80-3 alone is not the largest-bandwidth available channel). In an alternative embodiment, the probe response frames 162 are not restricted to sub-channels 80 that form valid channel combinations. In some of these latter embodiments, client station 25-1 nonetheless restricts the composite channel transmission 154 to valid channel combinations after receiving the probe response frame(s) 162.

In an embodiment, client station 25-1 considers any sub-channel 80 on which a probe response frame 162 is received to be clear from the standpoint of the intended receiver, AP 14. If a sub-channel 80 is determined to be idle or clear both from the standpoint of client station 25-1 and from the standpoint of the AP 14, that sub-channel 80 is determined to be available for use in the composite channel transmission 154 (subject to any channel combination rules), in an embodiment. Conversely, if a sub-channel 80 is determined to be busy either from the standpoint of client station 25-1 and/or from the standpoint of the AP 14, that sub-channel 80 is determined to be busy, and client station 25-1 excludes that sub-channel 80 from being used for the composite channel transmission 154, in an embodiment. In an embodiment, if client station 25-1 does not receive any probe response signals 162, client station 25-1 defers the transmission 154 and starts a new timer period (e.g., resets timer period 156).

In various other embodiments, client station 25-1 does not send the probe signal(s) 160 or wait for probe response signal(s) 162 if client station 25-1 only has a short data packet to send (e.g., a data packet with a length roughly equivalent to the probe signal 160, etc.), if client station 25-1 determines that all the sub-channels 80 are idle, and/or if client station 25-1 detects that communication activities on sub-channels 80 that are determined to be busy are not related to (e.g., are not sent to or from) the intended receiver, AP 14.

In the example scenarios of FIGS. 3A and 3B, after the available and permissible sub-channels 80 are determined, client station 25-1 transmits the composite channel transmission 154 to the AP 14 via the composite channel (i.e., via the available sub-channels 80, subject to any combination rules applied by client station 25-1). The composite channel transmission 154 includes a single data frame or multiple data frames, according to various embodiments and/or scenarios. When the AP 14 receives the transmission 154, the AP 14 sends an acknowledgement (ACK) 164 (e.g., an ACK frame) back to client station 25-1 on each of the sub-channels 80 used for the transmission 154, in an embodiment.

In the example transmission sequence 150 shown in FIG. 3A, client station 25-1 either does not maintain a device-specific NAV for the intended receiver AP 14, or maintains a NAV specific to AP 14 that indicates that AP 14 is not busy. Moreover, FIG. 3A shows a scenario in which client station 25-1 determines that all of NAVs 155 indicate that the respective sub-channels 80 are not reserved by other devices. Further, FIG. 3A shows a scenario in which none of the sub-channels 80 is determined to be busy from either the standpoint of the transmitter (client station 25-1) or from the standpoint of the intended receiver (AP 14). Accordingly, client station 25-1 transmits the composite channel transmission 154 to AP 14 using all of sub-channels 80-1 through 80-6.

In the example transmission sequence 152 shown in FIG. 3B, client station 25-1 again either does not maintain a device-specific NAV for the intended receiver AP 14, or maintains a NAV specific to the AP 14 that indicates that the AP 14 is not busy. Moreover, FIG. 3B shows a scenario in which client station 25-1 determines that NAVs 155-1 through 155-5 indicate that the sub-channels 80-1 through 80-5, respectively, are not reserved by other devices (e.g., client station 25-2 and/or client station 25-3), and determines that NAV 155-6 indicates that the sub-channel 80-6 is reserved by one or more other devices. Further, FIG. 3B shows a scenario in which sub-channel 80-4 is determined to be busy from the standpoint of the transmitting device, client station 25-1. Because NAV 155-6 indicated that sub-channel 80-6 is reserved, and because client station 25-1 determined that the sub-channel 80-4 is busy (e.g., using CCA techniques), the transmission sequence 152 shows that probe frames 160 are sent only on sub-channels 80-1, 80-2, 80-3, and 80-5. Moreover, in the example scenario of FIG. 3B, probe response frames 162 are received only on sub-channels 80-1 and 80-2. In various embodiments and scenarios, probe response frames 162 are received only on sub-channels 80-1 and 80-2 because the intended receiver AP 14 determined that one or both of sub-channels 80-3 and 80-5 is/are not clear (e.g., using CCA techniques and/or checking NAV status at AP 14), and/or determined that one or both of sub-channels 80-3 and 80-5 is/are not a permitted sub-channel within a largest-bandwidth composite channel (e.g., by applying combination rules similar to those discussed above with reference to FIG. 2).

Figure 4:
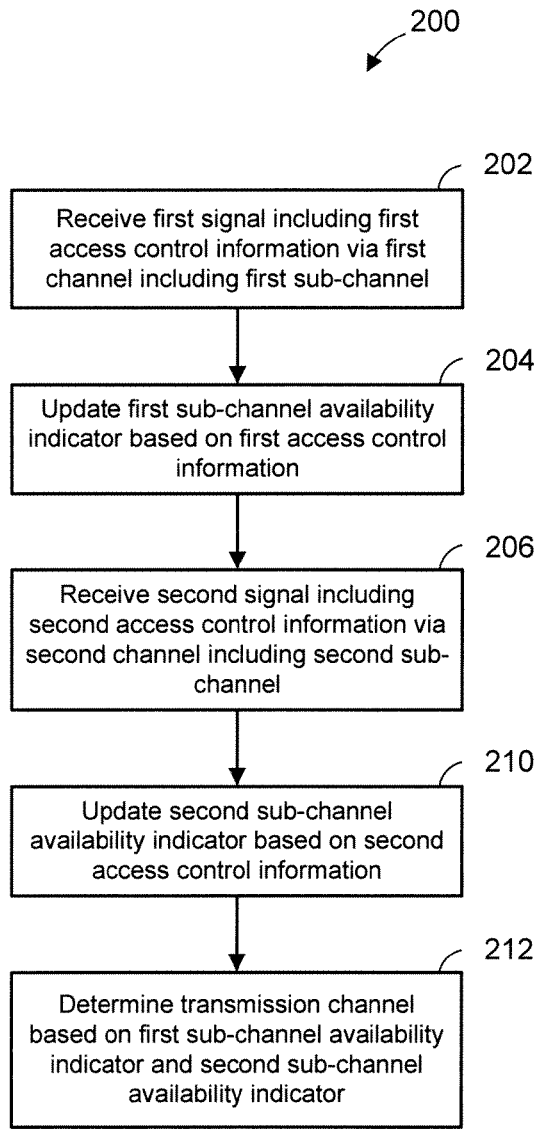
FIG. 4 is a flow diagram of an example method for determining a transmission channel formed from one or more sub-channels, according to an embodiment.

FIG. 4 is a flow diagram of an example method 200 for determining a transmission channel formed from one or more sub-channels, according to an embodiment. In one embodiment and scenario, a network interface such as the network interface 16 (e.g., the MAC processing unit 18 and/or the PHY processing unit 20) of the AP 14 in FIG. 1 implements the method 200 when determining a transmission intended for a client station such as client station 25-1 of FIG. 1. In other embodiments and scenarios, a network interface such as the network interface 27 (e.g., the MAC processing unit 29 and/or the PHY processing unit 30) of the client station 25-1 implements the method 200 when determining a transmission intended for an AP such as the AP 14 of FIG. 1, or, in a P2P system, when determining a transmission intended for another client station such as client station 25-2 or 25-3 of FIG. 1. In an embodiment, the sub-channels of the method 200 correspond to the sub-channels 80 described above with reference to FIGS. 2 and 3. In other embodiments, the sub-channels of the method 200 correspond to sub-channels that are different than the sub-channels 80.

At block 202, a first signal is received via a first channel. The first signal includes first access control information indicating an expected utilization of the first channel. In an embodiment, the first access control information is included in a preamble or header of a data or control frame of the first signal. In the example method 200, the first channel includes a first sub-channel, and in some embodiments and scenarios also includes one or more other sub-channels. In an embodiment, the expected utilization of the first channel includes a first time duration. For example, in various embodiments, the first time duration is a time that reflects an expected amount of time needed for communications between other devices on the first channel, or simply a time during which one or more other devices have reserved the first channel in the event that the channel is needed, etc. In an embodiment, the first signal received at block 202 is a part of a communication that is not specifically intended for the communication device implementing the method 200, but is nonetheless detected by the communication device implementing the method 200.

At block 204, a first sub-channel availability indicator is updated based on the first access control information included in the first signal received at block 202. The first sub-channel availability indicator indicates an expected utilization of the first sub-channel. For example, the first sub-channel availability indicator is a NAV stored in a memory such as the memory 17 (e.g., if the method 200 is implemented in the AP 14) or the memory 28 (e.g., if the method 200 is implemented in the client device 25-1) of FIG. 1, in an embodiment. In an embodiment, the first sub-channel availability indicator includes a first counter value, and is updated at block 204 at least in part by setting the counter value to a value based on a first time duration included in the signal received at block 202. For example, in various embodiments, the first sub-channel availability indicator is a counter value that is set equal to a time duration included in the first signal, or set to a value slightly greater than the time duration included in the first signal, etc.

At block 206, a second signal is received via a second channel. The second signal includes second access control information indicating an expected utilization of the second channel. In an embodiment, the second access control information is included in a preamble or header of a data or control frame of the second signal. The second channel includes a second sub-channel, and in some embodiments and scenarios also includes one or more other sub-channels. In an embodiment, the expected utilization of the second channel includes a second time duration. In an embodiment, the signal received at block 206 is a signal that is not specifically sent to a communication device implementing the method 200 (e.g., AP 14 or client station 25-1), but is nonetheless detected by the communication device.

At block 210, a second sub-channel availability indicator is updated based on the second access control information included in the second signal received at block 206. The second sub-channel availability indicator indicates an expected utilization of the second sub-channel. In an embodiment, the second sub-channel availability indicator is similar to the first sub-channel availability indicator. For example, in various embodiments, the second sub-channel availability indicator is a counter value that is set equal to a duration included in the second signal, or set to a value slightly greater than the duration in the second signal, etc.

At block 212, a transmission channel is determined based on the first sub-channel availability indicator updated at block 204 and the second sub-channel availability indicator updated at block 210. The determination at block 212 may occur at any suitable time after the updates at blocks 204 and/or 210, or may occur before the updates at blocks 204 and/or 210, depending on the timing of receiving the first and second signals, and depending on when the communication device implementing the method 200 determines that data is available to be sent to an intended receiver. In an embodiment, the transmission channel is determined to exclude the first sub-channel if the first sub-channel availability indicator indicates the first sub-channel is reserved, and is determined to exclude the second sub-channel if the second sub-channel availability indicator indicates the second sub-channel is reserved.

Figure 5:
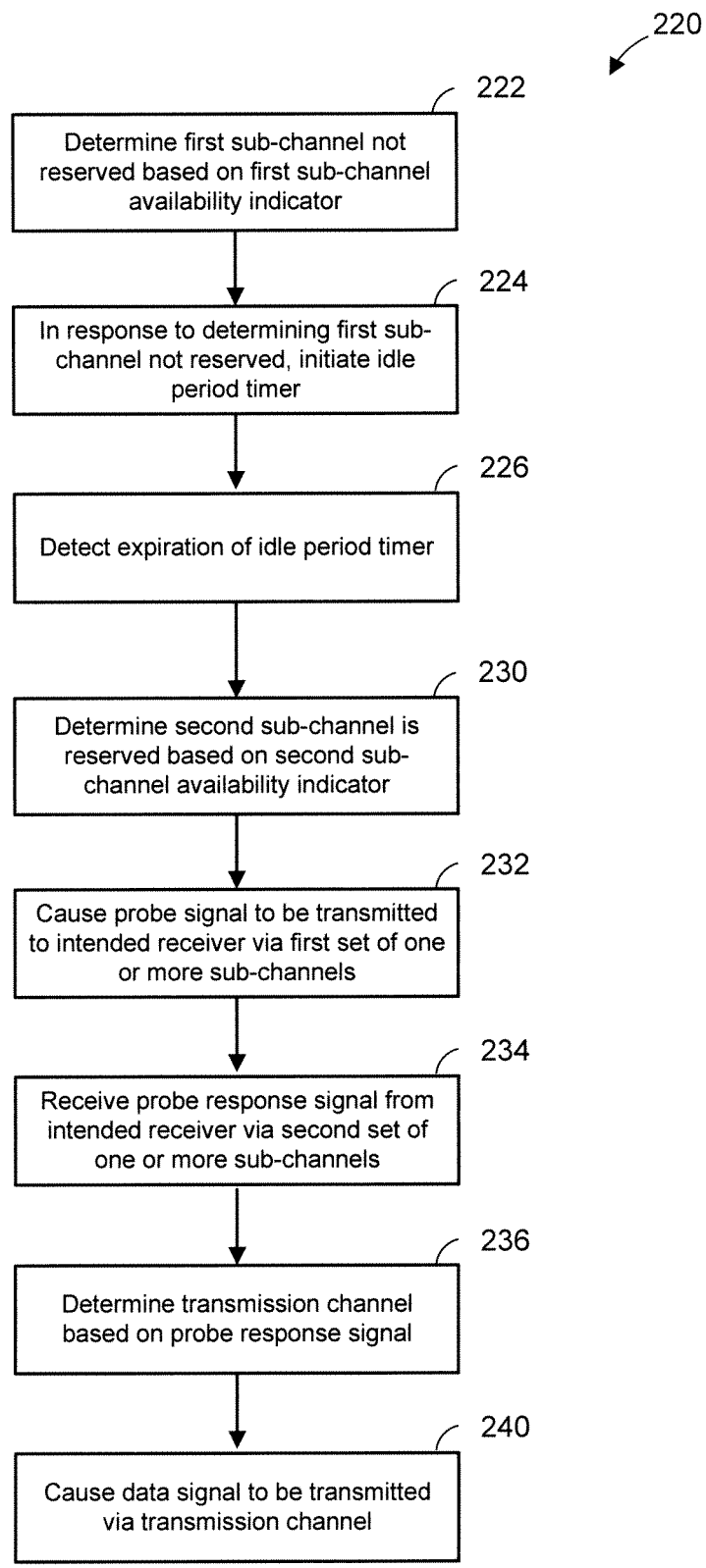
FIG. 5 is a flow diagram of an example method for determining a transmission channel that is included in the example method of FIG. 4, according to an embodiment.

FIG. 5 is a block diagram of an example method 220 for determining a transmission channel, according to an embodiment. In some embodiments and scenarios, block 212 of FIG. 4 is implemented using the method 220 of FIG. 4. Thus, in some embodiments, block 212 of FIG. 4 includes each of the blocks shown in the example method 220 of FIG. 5. In these embodiments, the method 250 is implemented in the same communication device that implements the method 200 (e.g., an AP such as AP 14 or a client station such as client station 25-1).

At block 222, it is determined, based on the first sub-channel availability indicator, that the first sub-channel is not reserved. For example, in one embodiment and scenario, it is determined that a counter of the first sub-channel availability indicator updated at block 204 of FIG. 4 has decreased to zero.

At block 224, an idle period timer is initiated in response to determining at block 222 that the first sub-channel is not reserved. In an embodiment, the idle period timer measures a suitable time period for detecting whether the first sub-channel is likely to be unused by other communication devices in the same system. For example, the idle period timer measures a PIFS, AIFS, or DIFS, according to various embodiments, and/or may include a randomly generated back-off period.

At block 226, an expiration of the idle period timer is detected. In an embodiment, the idle period timer expires when the measured time duration (e.g., PIFS, AIFS, or DIFS, etc., and/or a randomly generated back-off period) elapses, during which no signal is detected on the first sub-channel (including any channel that encompasses the first sub-channel). If a signal is detected on the first sub-channel prior to the idle period timer elapsing, the idle period timer is reset, in an embodiment.

At block 230, it is determined, based on the second sub-channel availability indicator, that the second sub-channel is reserved. For example, in one embodiment and scenario, the second sub-channel availability indicator includes a counter value that has not yet decreased to zero after being updated (at block 210 of FIG. 4) based on a time duration included in the second signal (received at block 206 of FIG. 4).

At block 232, a probe signal is transmitted (or caused to be transmitted) to an intended receiver via a first set of one or more sub-channels. In an embodiment, the first set of one or more sub-channels excludes all sub-channels that are currently reserved according to the corresponding sub-channel availability indicators, and excludes all sub-channels that are determined to be busy during a corresponding idle period timer duration. In the embodiment and scenario of the method 220, the first set of one or more sub-channels includes the first sub-channel, and excludes the second sub-channel. In an embodiment, the probe signal includes a short frame transmitted to the intended receiver on each sub-channel of the first set of one or more sub-channels.

At block 234, a probe response signal is received via a second set of one or more sub-channels. In an embodiment, the probe response signal is sent from the intended receiver to the communication device implementing the method 220, and includes a short frame transmitted on each of one or more sub-channels that are determined to be clear from the standpoint of the intended receiver. The second set of one or more sub-channels on which the probe response signal is received is either the same as the first set of one or more sub-channels on which the probe signal was caused to be transmitted at block 232, or a subset of the first set of one or more sub-channels, according to various embodiments and scenarios. In an embodiment and scenario in which the intended receiver determines that one or more sub-channels of the first set of sub-channels is not available, for example (e.g., based on a NAV maintained by the intended receiver, and/or based on CCA techniques performed by the intended receiver, etc.), the probe response signal is not sent on the unavailable sub-channels, and therefore the second set of sub-channels is only a subset of the first set of sub-channels. In an embodiment, the probe response signal is only sent via sub-channels that provide the largest available bandwidth while still forming a permissible channel combination.

At block 236, the transmission channel is determined based on the probe response signal received at block 234. The determined transmission channel is either the same as the second set of one or more sub-channels (via which the probe response signal was received at block 234) or a subset of the second set of one or more sub-channels. In an embodiment, the transmission channel is the same as the second set of sub-channels so long as the second set of sub-channels forms a permissible channel combination. In one embodiment in which the probe response signal is only sent via sub-channels that combine to form a permissible channel combination, the transmission channel is the same as the second set of sub-channels.

At block 240, a data signal is transmitted (or caused to be transmitted) to the intended receiver via the transmission channel determined at block 236. According to various embodiments and/or scenarios, the data signal includes one or more data frames.

In various other embodiments and/or scenarios, the methods 200 and/or 220 include additional blocks not shown in FIGS. 4 and 5. For example, in one scenario where the second channel used by the second signal received at block 206 includes a third sub-channel in addition to the second sub-channel, the method 200 also includes updating a third sub-channel availability indicator based on the second access control information in the second signal, and the method 220 also includes a determination that the third sub-channel (like the second sub-channel) is reserved. Moreover, in various other embodiments and/or scenarios, some of the blocks in the method 220 (e.g., blocks 224 and 226 relating to the idle period timer) are omitted, and/or the blocks in the method 200 and/or the method 220 are performed in a different order than shown.

Figure 6:
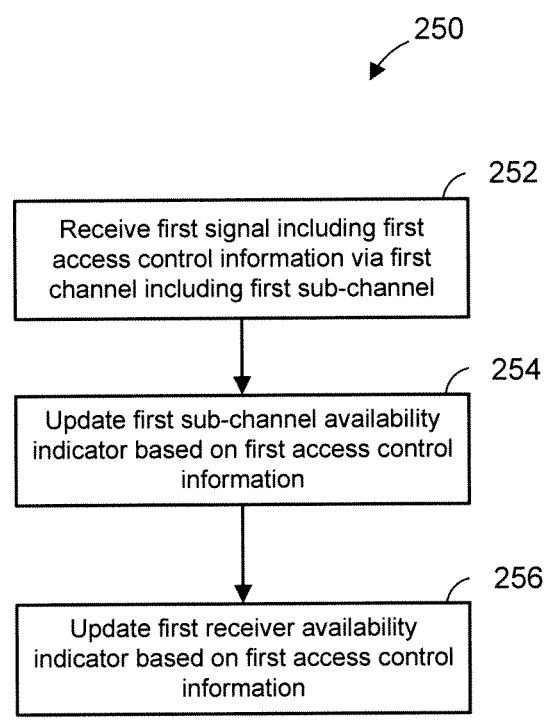
FIG. 6 is a flow diagram of an example method for determining channel and receiver availability, according to an embodiment.

FIG. 6 is a flow diagram of an example method 250 for determining channel and receiver availability, according to an embodiment. In one embodiment and scenario, a network interface such as the network interface 16 (e.g., the MAC processing unit 18 and/or the PHY processing unit 20) of the AP 14 in FIG. 1 implements the method 250. In other embodiments and scenarios, a network interface such as the network interface 27 (e.g., the MAC processing unit 29 and/or the PHY processing unit 30) of the client station 25-1 implements the method 250. In an embodiment, the sub-channels referred to in the description of the method 250 below correspond to the sub-channels 80 described above in connection with FIGS. 2 and 3. In other embodiments, the sub-channels referred to in the description of the method 250 below correspond to suitable sub-channels different than the sub-channels 80.

At block 252, a first signal is received from a first receiver via a first channel. The first signal includes first access control information indicating an expected utilization of the first channel by the first receiver (e.g., expected transmissions of data from and/or to the first receiver, in an embodiment). In an embodiment, the first access control information is included in a preamble of a data or control frame of the first signal. The first channel includes a first sub-channel, and in some embodiments and scenarios also includes one or more other sub-channels. In an embodiment, the expected utilization of the first channel by the first receiver includes a first time duration. For example, in various embodiments, the first time duration is a time set by the first receiver to reflect an expected amount of time needed for communications with another device communicating with the first receiver, or simply an amount of time reserved by the first receiver for possible future communications, etc. In an embodiment, the first signal received at block 252 is a part of a communication that is not necessarily specifically intended for the communication device implementing the method 250, but is nonetheless detected by the communication device implementing the method 250.

At block 254, a first sub-channel availability indicator is updated based on the first access control information in the first signal received at block 252. In an embodiment, the block 254 is similar to block 204 of FIG. 4.

At block 256, a first receiver availability indicator is updated based on the first access control information. In an embodiment, the first receiver availability indicator indicates expected communication activity of the first receiver. For example, the first receiver availability indicator is a NAV stored in a memory such as the memory 17 (e.g., if the method 200 is implemented in the AP 14) or the memory 28 (e.g., if the method 200 is implemented in the client device 25-1) of FIG. 1, in an embodiment. In an embodiment, the first receiver availability indicator includes a counter value, and is updated at block 256 at least in part by setting the counter value to a value based on a time duration included in the signal received at block 252. For example, in an embodiment, the first receiver availability indicator and the first sub-channel availability indicator are both set to a same counter value based on a time duration included in the first signal. In other embodiments, the first receiver availability indicator and the first sub-channel availability indicator are set to different counter values based on the time duration included in the first signal.

FIG. 7 is a flow diagram of an example method 260 for transmitting data, according to an embodiment. In an embodiment, the method 260 is implemented in conjunction with the method 250. For example, the method 260 is implemented in the same communication device that implements the method 250 (e.g., an AP such as AP 14 or a client station such as client station 25-1), in an embodiment. In an embodiment where the method 260 is implemented in addition to the method 250, the "first receiver" of methods 250 and 260 is an intended receiver to which the communication device implementing the methods 250 and 260 desires to transmit a data signal. For example, in one embodiment and scenario in which the methods 250 and 260 are implemented in the AP 14, the first receiver is a client station 25 (e.g., client station 25-1) to which the AP 14 intends to transmit data.

At block 262 of FIG. 7, it is determined, based on the first sub-channel availability indicator, that the first sub-channel is not reserved. For example, in one embodiment and scenario, the first sub-channel availability indicator includes a counter value that has decreased to zero after being updated (at block 254 of FIG. 6) to a suitable value based on a time duration included in the first signal (received at block 252 of FIG. 6).

At block 264, a first sub-channel idle period timer is initiated in response to determining (at block 262) that the first sub-channel is not reserved. In an embodiment, the first sub-channel idle period timer measures a suitable time period for detecting whether the first sub-channel is likely to be unused by other, nearby communication devices. For example, the first sub-channel idle period timer measures a PIFS, AIFS, or DIFS, according to various embodiments, and/or a randomly generated back-off period.

At block 266, it is determined, based on the first receiver availability indicator, that the first receiver is not busy. For example, in one embodiment and scenario, the first receiver availability indicator includes a counter value that has decreased to zero after being updated (at block 256 of FIG. 6) to a suitable value based on a time duration included in the first signal (received at block 252 of FIG. 6).

At block 270, a first receiver idle period timer is initiated in response to determining (at block 266) that the first receiver is not busy. In an embodiment, the first receiver idle period timer is a timer similar to the first sub-channel idle period timer described with reference to block 264. In other embodiments, the first receiver idle period timer and the first sub-channel idle period timer measure different time periods (e.g., one measures a time duration including a back-off period while the other measures a different time duration that does not include a back-off period, etc.).

At block 272, an expiration of the first sub-channel idle period timer (initiated at block 264) is detected. The first sub-channel idle period timer expires when a first length of time elapses, during which no signal is detected on the first sub-channel (including any channel that encompasses the first sub-channel). If a signal is detected on the first sub-channel prior to the first sub-channel idle period timer elapsing, the first sub-channel idle period timer is reset, in an embodiment.

At block 274, an expiration of the first receiver idle period timer (initiated at block 270) is detected. The first receiver idle period timer expires when a second length of time elapses, during which no signal to or from the first receiver is detected. In an embodiment, the second length of time is the same as the first length of time described with reference to block 272. In another embodiment, the second length of time is longer or shorter than the first length of time. In still another embodiment, the second length of time is longer, the same as, or shorter than the first length of time depending on various factors (e.g., the value of a randomly-generated back-off time). If a signal is sent to or from the first receiver is detected on any sub-channel(s) prior to the first receiver idle period timer elapsing, the first receiver idle period timer is reset, in an embodiment.

At block 276, a probe signal is transmitted (or caused to be transmitted) to the first receiver via a first set of one or more sub-channels. In an embodiment, the first set of one or more sub-channels excludes all sub-channels that are currently reserved according to the corresponding sub-channel availability indicators, and excludes all sub-channels that are determined to be busy during a corresponding idle period timer. In the embodiment and scenario of the method 260, the first set of one or more sub-channels includes the first sub-channel. In an embodiment, the probe signal includes a short frame transmitted to the first receiver on each sub-channel of the first set of one or more sub-channels.

At block 280, a probe response signal is received from the first receiver via a second set of one or more sub-channels. In an embodiment, the probe response signal is sent from the first receiver to the communication device implementing the method 260, and includes a short frame transmitted on each of one or more sub-channels that are determined to be clear from the standpoint of the first receiver. The second set of one or more sub-channels on which the probe response signal is received is either the same as the first set of one or more sub-channels on which the probe signal was transmitted (or caused to be transmitted) at block 276, or a subset of the first set of one or more sub-channels, according to various embodiments and scenarios. In an embodiment and scenario in which the first receiver determines that one or more sub-channels of the first set of sub-channels is not available, for example (e.g., based on an NAV maintained by the intended receiver, and/or based on CCA techniques performed by the intended receiver, etc.), the probe response signal is not sent on the unavailable sub-channels, and therefore the second set of sub-channels is only a subset of the first set of sub-channels. In an embodiment, the probe response signal is only sent via sub-channels that provide the largest available bandwidth while still forming a permissible channel combination.

At block 282, a transmission channel is determined based on the probe response signal received at block 280. The determined transmission channel is either the same as the second set of one or more sub-channels (via which the probe response signal was received at block 280), or a subset of the second set of one or more sub-channels. In an embodiment, the transmission channel is the same as the second set of sub-channels so long as the second set of sub-channels forms a permissible channel combination. In one embodiment in which the probe response signal is only sent via sub-channels that combine to form a permissible channel combination, the transmission channel is the same as the second set of sub-channels.

At block 284, a data signal is transmitted (or caused to be transmitted) to the first receiver via the transmission channel determined at block 282. According to various embodiments and/or scenarios, the data signal includes one or more data frames.

In various other scenarios, the methods 250 and/or 260 include additional blocks not shown in FIGS. 6 and 7, omit blocks that are shown in FIG. 6 and/or FIG. 7, and/or perform the blocks in a different order than shown. For example, in one embodiment and scenario, the method 250 includes a first additional block in which it is determined, based on the first receiver availability indicator, that the first receiver is busy, and a second additional block in which a data signal is prevented from being transmitted to the first receiver via any of the plurality of sub-channels in response to determining that the first receiver is busy. In this embodiment and scenario, the method 260 is either not implemented, or is only implemented at a later time after it is determined that the first receiver is no longer busy.

As another example, in one embodiment and scenario, it is instead determined at block 262, based on the first sub-channel availability indicator, that the first sub-channel is reserved. In this embodiment and scenario, blocks 264, 266, and 272 are omitted from the method 260, the probe signal caused to be transmitted at block 276 excludes the first sub-channel, and the transmission channel determined at block 282 excludes the first sub-channel.

As yet another example, in one embodiment and scenario, the method 250 includes a first additional block in which a second signal (including second access control information indicating an expected utilization of a second channel by a second receiver), sent to or from the second receiver, is received via the second channel, where the second channel includes a second sub-channel. In this embodiment and scenario, the method 250 also includes a second additional block in which a second sub-channel availability indicator is updated based on the second access control information, and a third additional block in which a second receiver availability indicator is updated based on the second access control information. In an embodiment, the second sub-channel availability indicator indicates when the second sub-channel is reserved, and the second receiver availability indicator indicates when the second receiver (e.g., a client station such as client station 25-2 of FIG. 1) is busy and cannot receive data on any sub-channels.

As still another example, in one embodiment, the method 260 omits blocks 270 and 274. For example, in an embodiment, a communication device implementing the method 260 uses timer periods to determine whether unreserved sub-channels are idle for a sufficient time period, but does not use timer periods to determine whether intended receivers are idle for a sufficient time period (e.g., an intended receiver is considered available as soon as a NAV specific to that receiver indicates the receiver is not busy, in an embodiment).

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of determining channel availability in a wireless communication network that utilizes a plurality of sub-channels, wherein multiple sub-channels in the plurality of sub-channels can be joined to form a composite channel, and wherein the plurality of sub-channels includes at least a first sub-channel and a second sub-channel, the method comprising:
receiving a first signal via a first channel, wherein
the first signal includes first access control information indicating an expected utilization of the first channel, and
the first channel includes the first sub-channel;
updating a first sub-channel availability indicator based on the first access control information, wherein the first sub-channel availability indicator indicates an expected utilization of the first sub-channel;

receiving a second signal via a second channel, wherein
   the second signal includes second access control information indicating an expected utilization of the second channel, and
   the second channel includes the second sub-channel;
updating a second sub-channel availability indicator based on the second access control information, wherein the second sub-channel availability indicator indicates an expected utilization of the second sub-channel; and
determining a transmission channel based on the first sub-channel availability indicator and the second sub-channel availability indicator.

2. A method according to claim 1, wherein:
the expected utilization of the first channel includes a first time duration;
the expected utilization of the second channel includes a second time duration;
the first sub-channel availability indicator includes a first counter value;
the second sub-channel availability indicator includes a second counter value;
updating the first sub-channel availability indicator based on the first access control information includes setting the first counter value to a first value determined based on the first time duration; and
updating the second sub-channel availability indicator based on the second access control information includes setting the second counter value to a second value determined based on the second time duration.

3. A method according to claim 1, wherein determining the transmission channel based on the first sub-channel availability indicator and the second sub-channel availability indicator includes:
determining, based on the first sub-channel availability indicator, whether the first sub-channel is reserved;
in response to determining that the first sub-channel is not reserved, initiating an idle period timer;
detecting an expiration of the idle period timer, wherein the idle period timer expires when a length of time, during which no signal is detected on the first sub-channel, elapses;
determining, based on the second sub-channel availability indicator, whether the second sub-channel is reserved; and
in response to (i) detecting the expiration of the idle period timer, and (ii) determining that the second sub-channel is reserved, causing a probe signal to be transmitted to an intended receiver via a first set of one or more sub-channels, wherein the first set of one or more sub-channels includes the first sub-channel and excludes the second sub-channel.

4. A method according to claim 3, wherein determining the transmission channel based on the first sub-channel availability indicator and the second sub-channel availability indicator further includes:
receiving a probe response signal via a second set of one or more sub-channels, wherein the second set of one or more sub-channels is either (i) the same as the first set of one or more sub-channels or (ii) a subset of the first set of one or more sub-channels;
determining the transmission channel based on the probe response signal, wherein the transmission channel is either (i) the same as the second set of one or more sub-channels or (ii) a subset of the second set of one or more sub-channels; and
causing a data signal to be transmitted via the transmission channel.

5. A communication device for use in a wireless communication network that utilizes a plurality of sub-channels, wherein multiple sub-channels in the plurality of sub-channels can be joined to form a composite channel, the communication device comprising:
a network interface configured to
   receive a first signal via a first channel, wherein
      the first signal includes first access control information indicating an expected utilization of the first channel, and
      the first channel includes a first sub-channel,
   update a first sub-channel availability indicator based on the first access control information, wherein the first sub-channel availability indicator indicates an expected utilization of the first sub-channel,
   receive a second signal via a second channel, wherein
      the second signal includes second access control information indicating an expected utilization of the second channel, and
      the second channel includes a second sub-channel,
   update a second sub-channel availability indicator based on the second access control information, wherein the second sub-channel availability indicator indicates an expected utilization of the second sub-channel, and
   determine a transmission channel based on the first sub-channel availability indicator and the second sub-channel availability indicator.

6. A communication device according to claim 5, wherein:
the expected utilization of the first channel includes a first time duration;
the expected utilization of the second channel includes a second time duration;
the first sub-channel availability indicator includes a first counter value;
the second sub-channel availability indicator includes a second counter value; and
the network interface is configured to
   update the first sub-channel availability indicator based on the first access control information at least in part by setting the first counter value to a first value based on the first time duration, and
   update the second sub-channel availability indicator based on the second access control information at least in part by setting the second counter value to a second value based on the second time duration.

7. A communication device according to claim 5, wherein the network interface is configured to determine the transmission channel based on the first sub-channel availability indicator and the second sub-channel availability indicator by
when the first sub-channel availability indicator indicates that the first sub-channel is not reserved,
   initiating a first sub-channel idle period timer, and
   detecting an expiration of the first sub-channel idle period timer, wherein the first sub-channel idle period timer expires when a first length of time, during which no signal is detected on the first sub-channel, elapses, and
when the second sub-channel availability indicator indicates that the second sub-channel is not reserved,
   initiating a second sub-channel idle period timer, and
   detecting an expiration of the second sub-channel idle period timer, wherein the second sub-channel idle period timer expires when a second length of time, during which no signal is detected on the second sub-channel, elapses.

8. A communication device according to claim 7, wherein the network interface is further configured to determine the transmission channel based on the first sub-channel availability indicator and the second sub-channel availability indicator by
    when the first sub-channel availability indicator indicates that the first sub-channel is not reserved,
        after detecting the expiration of the first sub-channel idle period timer, causing a first probe signal to be transmitted to an intended receiver via a first set of one or more sub-channels, wherein the first set of one or more sub-channels includes the first sub-channel,
        receiving a first probe response signal via a second set of one or more sub-channels, wherein the second set of one or more sub-channels is either (i) the same as the first set of one or more sub-channels or (ii) a subset of the first set of one or more sub-channels,
        determining the transmission channel based on the first probe response signal, wherein the transmission channel is either (i) the same as the second set of one or more sub-channels or (ii) a subset of the second set of one or more sub-channels, and
        causing a data signal to be transmitted via the transmission channel, and
    when the second sub-channel availability indicator indicates that the second sub-channel is not reserved,
        after detecting the expiration of the second sub-channel idle period timer, causing a second probe signal to be transmitted to an intended receiver via a third set of one or more sub-channels, wherein the third set of one or more sub-channels includes the second sub-channel,
        receiving a second probe response signal via a fourth set of one or more sub-channels, wherein the fourth set of one or more sub-channels is either (i) the same as the third set of one or more sub-channels or (ii) a subset of the third set of one or more sub-channels, and
        determining the transmission channel based on the second probe response signal, wherein the transmission channel is either (i) the same as the fourth set of one or more sub-channels or (ii) a subset of the fourth set of one or more sub-channels.

9. A communication device according to claim 5, further comprising:
a memory to store the first sub-channel availability indicator and the second sub-channel availability indicator.

10. A method of determining availability of channels and receivers in a wireless communication network that utilizes a plurality of sub-channels, wherein multiple sub-channels in the plurality of sub-channels can be joined to form a composite channel, the method comprising:
receiving a first signal sent to or from a first receiver via a first channel, wherein
    the first signal includes first access control information indicating an expected utilization of the first channel by the first receiver, and
    the first channel includes a first sub-channel of the plurality of sub-channels;
updating a first sub-channel availability indicator based on the first access control information, wherein the first sub-channel availability indicator indicates an expected utilization of the first sub-channel; and
updating a first receiver availability indicator based on the first access control information, wherein the first receiver availability indicator indicates expected communication activity of the first receiver.

11. A method according to claim 10, wherein:
the expected utilization of the first channel includes a first time duration;
the first sub-channel availability indicator includes a first counter value;
the first receiver availability indicator includes a second counter value;
updating the first sub-channel availability indicator based on the first access control information includes setting the first counter value to a first value determined based on the first time duration; and
updating the first receiver availability indicator based on the first access control information includes setting the second counter value to the first value or a second value determined based on the first time duration.

12. A method according to claim 10, further comprising:
determining, based on the first receiver availability indicator, whether the first receiver is busy; and
in response to determining that the first receiver is busy, preventing a data signal from being transmitted to the first receiver via any of the plurality of sub-channels.

13. A method according to claim 10, further comprising:
determining, based on the first sub-channel availability indicator, whether the first sub-channel is reserved; and
in response to determining that the first sub-channel is reserved, preventing a data signal from being transmitted via a transmission channel that includes the first sub-channel.

14. A method according to claim 10, further comprising:
receiving a second signal sent to or from a second receiver via a second channel, wherein
    the second signal includes second access control information indicating an expected utilization of the second channel by the second receiver, and
    the second channel includes a second sub-channel of the plurality of sub-channels;
updating a second sub-channel availability indicator based on the second access control information, wherein the second sub-channel availability indicator indicates an expected utilization of the second sub-channel; and
updating a second receiver availability indicator based on the second access control information, wherein the second receiver availability indicator indicates expected communication activity of the second receiver.

15. A method according to claim 10, further comprising:
determining, based on the first sub-channel availability indicator, whether the first sub-channel is not reserved;
in response to determining that the first sub-channel is not reserved, initiating a first sub-channel idle period timer;
determining, based on the first receiver availability indicator, whether the first receiver is busy;
in response to determining that the first receiver is not busy, initiating a first receiver idle period timer;
detecting an expiration of the first sub-channel idle period timer, wherein the first sub-channel idle period timer expires when a first length of time, during which no signal is detected on the first sub-channel, elapses;
detecting an expiration of the first receiver idle period timer, wherein the first receiver idle period timer expires when a second length of time, during which no signal to or from the first receiver is detected, elapses; and
in response to (i) the expiration of the first sub-channel idle period timer and (ii) the expiration of the first receiver idle period timer, causing a probe signal to be transmitted to the first receiver via a first set of one or more sub-channels, wherein the first set of one or more sub-channels includes the first sub-channel.

16. A method according to claim 15, further comprising:
receiving a probe response signal from the first receiver a via second set of one or more sub-channels, wherein the second set of one or more sub-channels is either (i) the same as the first set of one or more sub-channels or (ii) a subset of the first set of one or more sub-channels;

determining a transmission channel based on the probe response signal, wherein the transmission channel is either (i) the same as the second set of one or more sub-channels or (ii) a subset of the second set of one or more sub-channels; and causing a data signal to be transmitted to the first receiver via the transmission channel.

17. A communication device for use in a wireless communication network that utilizes a plurality of sub-channels, wherein multiple sub-channels in the plurality of sub-channels can be joined to form a composite channel, the communication device comprising:

a network interface configured to receive a first signal sent to or from a first receiver via a first channel, wherein the first signal includes first access control information indicating an expected utilization of the first channel by the first receiver, and the first channel includes a first sub-channel, update a first sub-channel availability indicator based on the first access control information, wherein the first sub-channel availability indicator indicates an expected utilization of the first sub-channel, and update a first receiver availability indicator based on the first access control information, wherein the first receiver availability indicator indicates expected communication activity of the first receiver.

18. A communication device according to claim 17, wherein:

the expected utilization of the first channel includes a first time duration;

the first sub-channel availability indicator includes a first counter value;

the first receiver availability indicator includes a second counter value; and the network interface is further configured to update the first sub-channel availability indicator based on the first access control information at least in part by setting the first counter value to a first value determined based on the first time duration, and update the first receiver availability indicator based on the first access control information at least in part by setting the second counter value to the first value or a second value determined based on the first time duration.

19. A communication device according to claim 17, wherein the network interface is further configured to:

initiate a first sub-channel idle period timer in response to the first sub-channel availability indicator indicating that the first sub-channel is not reserved;

initiate a first receiver idle period timer in response to the first receiver availability indicator indicating that the first receiver is not busy;

detect an expiration of the first sub-channel idle period timer, wherein the first sub-channel idle period timer expires when a first length of time, during which no signal is detected on the first sub-channel, elapses; and detect an expiration of the first receiver idle period timer, wherein the first receiver idle period timer expires when a second length of time, during which no signal to or from the first receiver is detected, elapses.

20. A communication device according to claim 19, wherein the network interface is further configured to:

in response to (i) the expiration of the first sub-channel idle period timer and (ii) the expiration of the first receiver idle period timer, cause a probe signal to be transmitted to the first receiver via a first set of one or more sub-channels, wherein the first set of one or more sub-channels includes the first sub-channel;

receive a probe response signal from the first receiver via a second set of one or more sub-channels, wherein the second set of one or more sub-channels is either (i) the same as the first set of one or more sub-channels or (ii) a subset of the first set of one or more sub-channels;

determine a transmission channel based on the probe response signal, wherein the transmission channel is either (i) the same as the second set of one or more sub-channels or (ii) a subset of the second set of one or more sub-channels; and cause a data signal to be transmitted to the first receiver via the transmission channel.

21. A communication device according to claim 17, further comprising:

a memory storing each of the first sub-channel availability indicator and the first receiver availability indicator.

* * * * *